US010611330B2

(12) United States Patent
Phillion et al.

(10) Patent No.: US 10,611,330 B2
(45) Date of Patent: Apr. 7, 2020

(54) SMART INITIATOR ASSEMBLY

(71) Applicant: TK Holdings Inc., Auburn Hills, MI (US)

(72) Inventors: Robert Phillion, Ray Township, MI (US); Phillip Maguire, Bloomfield Township, MI (US); Jason Lisseman, Shelby Township, MI (US); Len Cech, Brighton, MI (US); Kevin Chrustowski, Sterling Heights, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 169 days.

(21) Appl. No.: 15/595,363

(22) Filed: May 15, 2017

(65) Prior Publication Data
US 2017/0327068 A1    Nov. 16, 2017

Related U.S. Application Data

(60) Provisional application No. 62/336,204, filed on May 13, 2016.

(51) Int. Cl.
*B60R 21/017* (2006.01)
*F42B 3/12* (2006.01)
(Continued)

(52) U.S. Cl.
CPC .......... *B60R 21/0173* (2013.01); *B60K 28/14* (2013.01); *B60R 21/02* (2013.01);
(Continued)

(58) Field of Classification Search
CPC ..... B60R 21/0173; B60R 21/26; B60R 21/02; B60R 2021/26029; F42B 3/10; F42B 3/121; F42B 3/18; G06K 19/07703; B60K 28/14
See application file for complete search history.

(56) References Cited

U.S. PATENT DOCUMENTS 3,971,320 A    7/1976 Lee
5,559,303 A    9/1996 La Mura et al.
(Continued)

FOREIGN PATENT DOCUMENTS

JP    2007062492    3/2007
JP    2007226574    9/2007
JP    2008090813    4/2008

OTHER PUBLICATIONS

International Search Report and Written Opinion issued in International Application No. PCT/US17/32668, dated Aug. 1, 2017.

*Primary Examiner* — Peter D Nolan
(74) *Attorney, Agent, or Firm* — Meunier Carlin & Curfman LLC

(57) ABSTRACT

According to various implementations, a vehicle pyrotechnic initiator assembly includes an initiator that includes at least one electrode pin and a validation device in electrical communication with the at least one electrode pin. The validation device provides validation information about at least a portion of the initiator assembly and/or a safety device in which the initiator assembly is installed. The validation information may include a date associated with an expiration of the initiator assembly and/or the safety device. The validation information may also or alternatively include a manufacturer identity associated with a manufacturer of the initiator assembly and/or safety device. In some implementations, the validation device includes an electrical circuit and/or memory that stores the validation information. For example, the validation device may include an ASIC chip.

19 Claims, 6 Drawing Sheets

(51) Int. Cl.
*F42B 3/10* (2006.01)
*B60R 21/02* (2006.01)
*B60R 21/26* (2011.01)
*B60K 28/14* (2006.01)
*F42B 3/18* (2006.01)
*G06K 19/077* (2006.01)

(52) U.S. Cl.
CPC ............... B60R 21/26 (2013.01); F42B 3/10 (2013.01); F42B 3/121 (2013.01); F42B 3/18 (2013.01); G06K 19/07703 (2013.01); *B60R 2021/26029* (2013.01)

(56) References Cited

U.S. PATENT DOCUMENTS

| | | | |
|---|---|---|---|
| 5,686,691 A | 11/1997 | Hamilton et al. | |
| 6,129,975 A | 10/2000 | Curiel | |
| 6,166,452 A * | 12/2000 | Adams | F42B 3/121 307/10.1 |
| 6,275,756 B1 * | 8/2001 | Griggs | B60R 21/017 280/728.1 |
| 6,490,976 B1 | 12/2002 | Fisher et al. | |
| 6,564,715 B2 * | 5/2003 | Griggs, III | B60R 21/017 102/200 |
| 6,915,744 B2 * | 7/2005 | Tirmizi | F42B 3/121 102/202.12 |
| 7,042,346 B2 * | 5/2006 | Paulsen | G07C 5/085 340/438 |
| 7,155,353 B2 * | 12/2006 | Okamoto | B60R 21/017 702/65 |
| 7,364,190 B2 * | 4/2008 | Okamoto | B60R 21/017 102/215 |
| 8,096,242 B2 * | 1/2012 | Maeda | B60R 21/2644 102/202.7 |
| 8,547,680 B2 | 10/2013 | Koike et al. | |
| 9,688,235 B2 * | 6/2017 | Yamauchi | F42B 3/121 |
| 9,945,645 B2 * | 4/2018 | Yamauchi | F42B 3/121 |
| 2003/0005843 A1 | 1/2003 | Tirmizi et al. | |
| 2005/0035852 A1 * | 2/2005 | Paulsen | G07C 5/085 340/438 |
| 2010/0018431 A1 * | 1/2010 | Maeda | B60R 21/2644 102/530 |
| 2011/0210535 A1 * | 9/2011 | Koike | F42B 3/121 280/741 |
| 2014/0060366 A1 | 3/2014 | Rastegar et al. | |
| 2016/0052481 A1 * | 2/2016 | Yamauchi | F42B 3/121 102/530 |
| 2016/0117496 A1 | 4/2016 | Bielstein | |
| 2016/0223301 A1 * | 8/2016 | Yamauchi | F42B 3/121 |

* cited by examiner

SMART INITIATOR ASSEMBLY

CROSS REFERENCE TO RELATED APPLICATION

This application claims priority to U.S. Patent Application No. 62/336,204, entitled "Smart Initiator Assembly," which was filed on May 13, 2016, the content of which is herein incorporated by reference in its entirety.

BACKGROUND

Initiators are simple pyrotechnic squibs that initiate deployment of certain vehicle safety devices. For example, initiators may be installed in air bags, seat belt restraint systems, or hood actuators of a vehicle. However, currently there are not any systems that communicate an age or a manufacturer of the safety devices or initiator assemblies.

Thus, there is a need in the art to provide an initiator and/or safety device for which validation information is trackable.

BRIEF SUMMARY

According to various implementations, a vehicle pyrotechnic initiator assembly includes an initiator that includes at least one electrode pin and a validation device in electrical communication with the at least one electrode pin. The validation device provides validation information about at least a portion of the initiator assembly and/or the safety device. In some implementations, the validation device includes an electrical circuit and/or memory that stores the validation information. For example, the validation device may include an ASIC chip. The validation information may include a date associated with an expiration of the initiator assembly and/or a manufacturer identity associated with a manufacturer of the initiator assembly. In some implementations, the validation information may also be associated with the safety device since the initiator assembly is not removable without damaging the safety device, according to some implementations. In alternative implementations, the validation information may be associated with the safety device and with an expiration of the safety device and/or a manufacturer identity associated with a manufacturer of the safety device.

In some implementations, the initiator includes an initiating circuit in electrical communication with the at least one electrode pin, and the initiating circuit and the validation device are disposed within a housing of the initiator assembly.

In other implementations, the initiating circuit and the validation device are disposed in separate housings. The initiating circuit is disposed within a first housing and is electrically coupled to at least two electrode pins that are physically coupled to the first housing. The validation device is disposed within a second housing, and the second housing defines at least two openings. Each opening is sized to receive one of the electrode pins therethrough. The second housing is separate from the first housing and a safety device in which the initiator is configured for being disposed. The electrode pins are electrically coupled to the validation device in the second housing via at least an annular portion of a surface of the openings.

In certain implementations, the validation device is in electrical communication with an electrical control system disposed within the vehicle separate from the initiator assembly. The electrical control system includes a second memory and a processor in communication with the second memory. The processor executes computer-readable instructions stored on the second memory, and the instructions cause the processor to receive the validation information from the validation device and generate an alarm signal if the validation information indicates the vehicle pyrotechnic initiator assembly or the safety device in which the initiator assembly is installed is expired or counterfeit.

In some implementations, the validation information may include a date of manufacture of the vehicle pyrotechnic initiator assembly and/or safety device, and the instructions further cause the electrical control system processor to generate the alarm signal in response to a current date being later than the date of manufacture plus an expiration period following the date of manufacture. In other implementations, the validation information includes an expiration date of the vehicle pyrotechnic initiator assembly and/or safety device, and the instructions further cause the electrical control system processor to generate the alarm signal in response to a current date being later than the expiration date.

The alarm signal may be an expiration alarm signal, and the validation information may also include a manufacturer identity associated with a manufacturer of the vehicle pyrotechnic initiator assembly and/or safety device, according to some implementations. The instructions further cause the electrical control system processor to compare the manufacturer identity with an expected manufacturer identity and generate a counterfeit alarm signal if the manufacturer identity and the expected manufacturer identity do not correspond.

In some implementations, the expected manufacturer identity is stored in the second memory. In addition, in some implementations, the date and/or the manufacturer identity include at least one alpha and/or numeric code.

In some implementations, the instructions stored in the second memory may cause the processor to allow an initiating current to be conducted to an initiating circuit of the initiator.

In some implementations, the validation device may include a microprocessor in electrical communication with the first memory, and the microprocessor executes computer-readable instructions stored on the first memory that cause the microprocessor to measure a resistance of the initiating circuit. The microprocessor may, for example, provide the measured resistance of the initiating circuit to the electrical control system. The microprocessor may also compare the measured resistance to an acceptable range and provide a signal to the electrical control system indicating whether the measured resistance of the initiating circuit is within or outside of the acceptable range. Alternatively, the second memory may store instructions that cause the processor of the electrical control system to receive the measured resistance of the initiating circuit from the microprocessor, compare the measured resistance to the acceptable range, and generate a fault signal in response to the measured resistance being outside of the acceptable range.

Various other implementations include a method of validating a vehicle pyrotechnic initiator assembly and/or a safety device in which the initiator assembly is installed. The method includes: (1) receiving validation information about at least a portion of a vehicle pyrotechnic initiator assembly and/or the safety device; (2) comparing the validation information with expected validation information; and (3) in response to the validation information not corresponding to the expected validation information, generating an alarm signal.

BRIEF DESCRIPTION OF THE DRAWINGS

Various implementations of the system are explained in even greater detail in the following exemplary drawings. The drawings are merely exemplary to illustrate the structure of the system and certain features that may be used singularly or in combination with other features. The invention should not be limited to the implementations shown.

DETAILED DESCRIPTION

According to various implementations, a vehicle pyrotechnic initiator assembly includes an initiator that includes at least one electrode pin and a validation device in electrical communication with the at least one electrode pin. The validation device provides validation information about at least a portion of the initiator assembly and/or a safety device in which the initiator assembly is installed. The validation information may include a date associated with an expiration of the initiator assembly and/or the safety device. The validation information may also or alternatively include a manufacturer identity associated with a manufacturer of the initiator assembly and/or safety device. In some implementations, the validation device includes an electrical circuit and/or memory that stores the validation information. For example, the validation device may include an ASIC chip.

The initiator assembly includes an initiator with an initiating circuit. When current is provided to the initiating circuit, the initiating circuit initiates a combustion reaction within the initiator assembly, and the combustion products may be provided to a vehicle safety device, such as a vehicle air bag, a seat belt restraint, or a hood lifting actuator. In addition, the resistance of the initiating circuit may be measured (e.g., at vehicle start up) and compared with an acceptable range of resistance for the initiating circuit to verify the operability of the initiating circuit. The initiator assembly according to various implementations also includes a validation device that stores validation information, such as a date associated with an expiration of the initiator assembly and/or a manufacturer identity associated with a manufacturer of the initiator assembly. The validation information may be used to determine whether the initiator assembly is expired and/or whether the manufacturer identify matches the expected manufacturer. For example, the validation information may include a serial number that indicates the date of manufacture (or expiration date) and/or the manufacturer identity. Because the initiator assembly cannot be removed from the safety device without destroying the safety device and/or the initiator assembly, the validation information associated with the initiator assembly may be used to track an expiration and/or manufacturer of the safety device.

Figure 1:
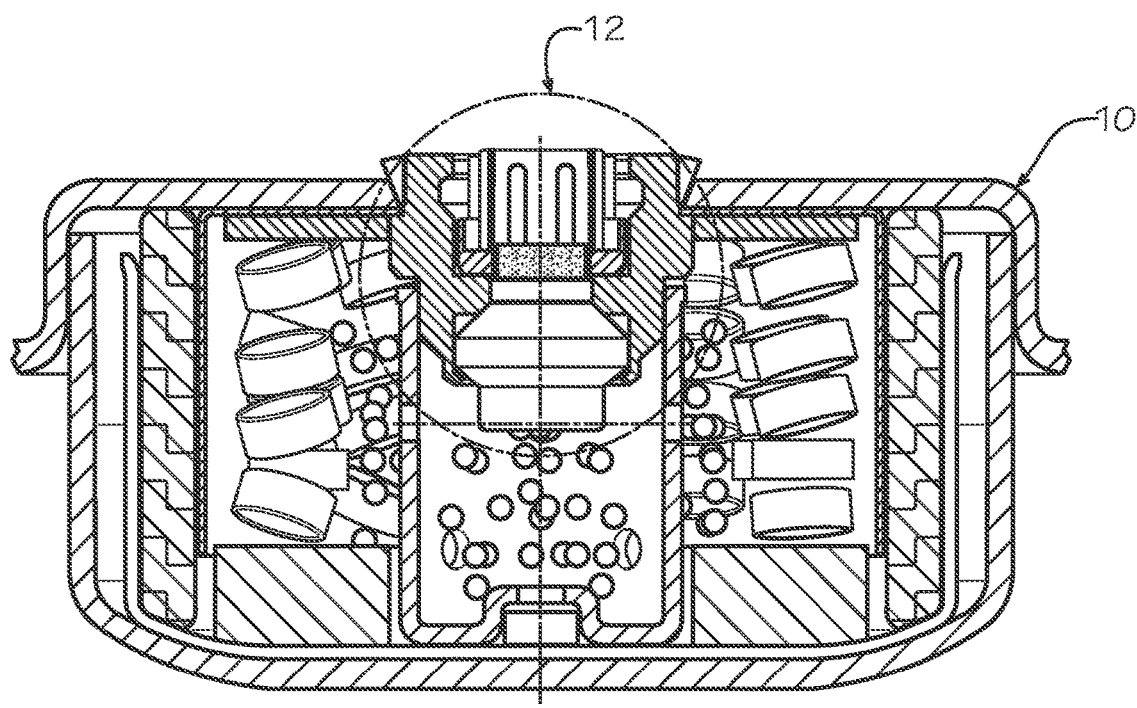
FIG. 1 illustrates a cross sectional view of a vehicle air bag inflator with an initiator assembly installed therein according to one implementation.
Figure 2A:
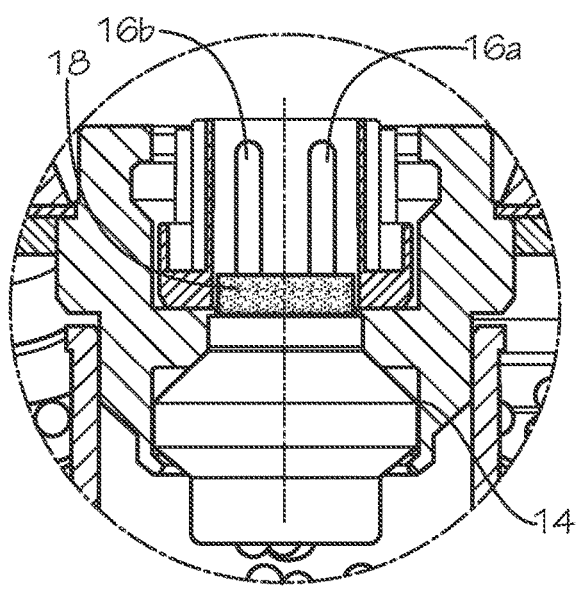
FIG. 2A illustrates a close up view of the initiator assembly shown in FIG. 1. The initiator assembly shown includes a first housing and a second housing.
Figure 2B:
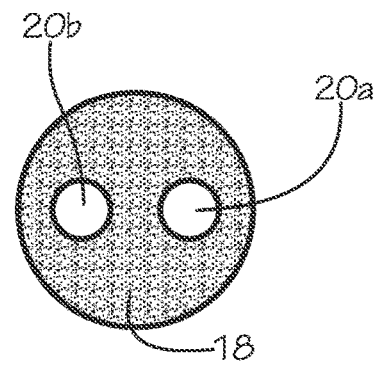
FIG. 2B illustrates a plan view of the second housing shown in FIG. 2A, according to one implementation.
Figure 3:
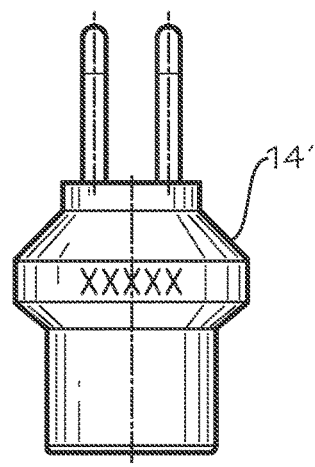
FIG. 3 illustrates an initiator assembly with an initiating circuit and validation device within the same housing according to another implementation.

FIG. 1 illustrates a cross sectional view of an inflator 10 with an initiator assembly 12 installed therein, according to one implementation, and FIG. 2A illustrates a close up of the initiator assembly 12. Although the inflator 10 shown is typically used with a vehicle air bag, any safety device may use the described initiator assembly 12. The initiator assembly 12 includes an initiator 14 and a second housing 18. The initiator 14 includes at least two electrode pins 16a, 16b that are physically coupled thereto. An initiating circuit is disposed within the initiator 14 and is electrically coupled to the at least two electrode pins 16a, 16b. A validation device (not shown in FIGS. 1 and 2A-2B) is disposed within a second housing 18, and the second housing 18 defines at least two openings 20a, 20b, as shown in FIG. 2B. Each opening 20a, 20b is sized to receive one of the electrode pins 16a, 16b therethrough. The second housing 18 is separate from the initiator 14 and the inflator 10. The electrode pins 16a, 16b are electrically coupled to the validation device in the second housing 18 via at least an annular portion of a surface of each opening 20a, 20b that is in contact with an outer surface of the respective pin 16a, 16b. In an alternative implementation, the validation device may be disposed within the body of initiator 14' and no separate housing is needed for the validation device, such as is shown in FIG. 3.

Figure 4:
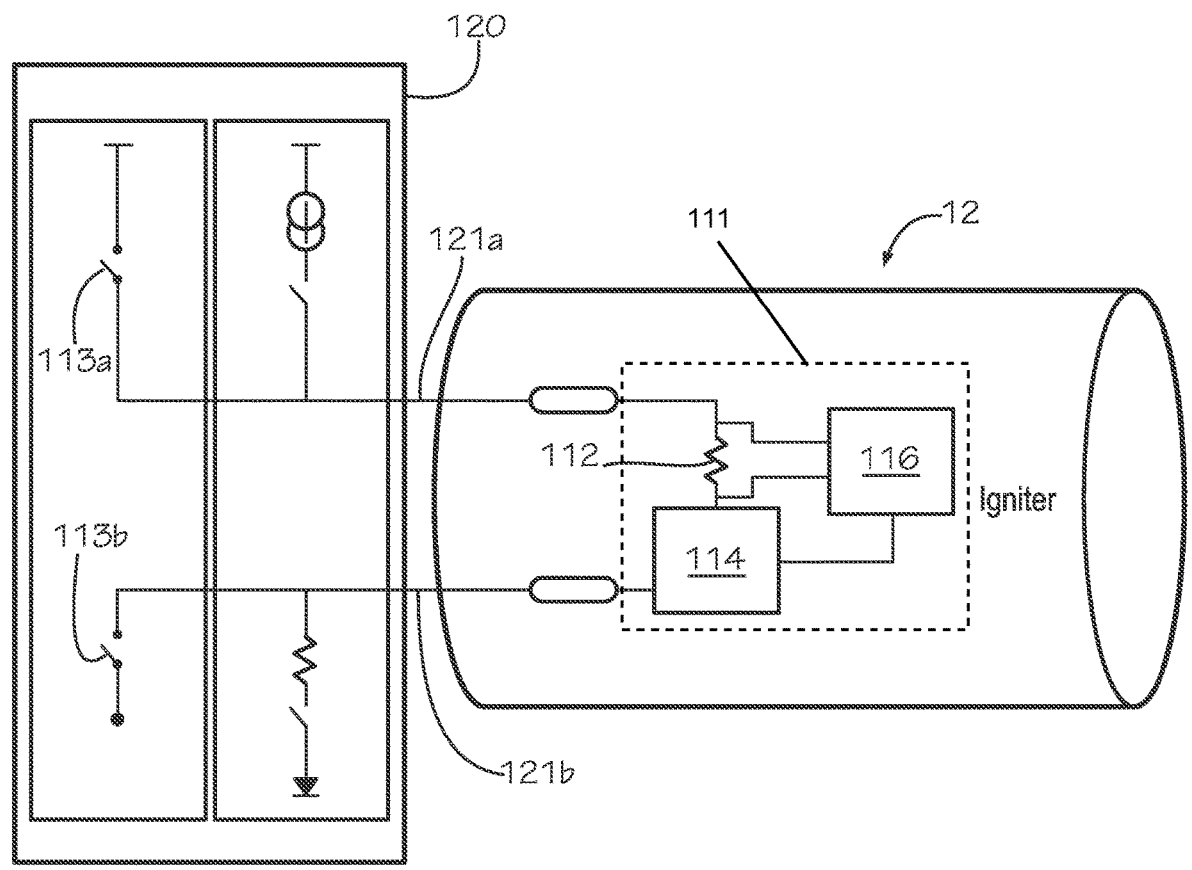
FIG. 4 illustrates a circuit diagram for the initiator assembly having two wires according to one implementation.

FIG. 4 illustrates an exemplary circuit diagram for the initiator assembly 12 and vehicle electrical control system 120, according to certain implementations. The initiator assembly 12 and the vehicle control system 120 are coupled by two wires, 121a and 121b. The initiator assembly 12 includes a validation device 111 that includes a memory 114 for communicating and storing the validation information. The validation device 111 also includes initiating circuit 112 and a microprocessor 116 for measuring a resistance of the initiating circuit 112. The components of the initiator assembly 12 are in electrical communication with the electrical control system 120 via two wires 121a, 121b.

The electrical control system 120, which is disposed in the vehicle separately from the initiator assembly 12, includes a processor that receives the validation information from the memory 114 of the initiator assembly 12 and initiation switches 113a, 113b that turn on simultaneously to allow current to flow to the initiating circuit 112 of the initiator assembly 12. The validation information includes a date of manufacture of the initiator assembly 12, and the processor may generate an expiration alarm signal in response to a current date being later than the date of manufacture plus an expiration period following the date of manufacture. Alternatively, the validation information may include an expiration date of the initiator assembly 12, and the processor generates an expiration alarm signal in response to a current date being later than the expiration date. In addition, the validation information may also include a manufacturer identity associated with a manufacturer of the assembly 12, and the processor may compare the manufacturer identity with an expected manufacturer identity and generate a counterfeit alarm signal if the manufacturer identity and the expected manufacturer identity do not correspond.

The expiration period, the current date, and the expected manufacturer identity may be stored in the second memory, for example. Alternatively, the current date may be provided by a clock (not shown) to the processor, and the expiration period and/or the expected manufacturer identity may be stored elsewhere in the vehicle.

In one implementation, the date of manufacture (or expiration date) and the manufacturer identity may be stored in a second memory in electrical communication with the processor. The second memory may also store instructions to be carried out by the processor. Alternatively, the current date may be provided by a clock (not shown) to the processor, and the expiration period, the expected manufacturer identity, and/or the instructions may be stored elsewhere in the vehicle.

In addition, the date of manufacture (or expiration date) and the manufacturer identity may be associated with a serial number. Alternatively, the date and identity may be associated with an alpha and/or numeric code, for example.

The processor also allows an initiating current to be conducted to the initiating circuit 112 of the initiator assembly 12, according to various implementations.

As noted above, the microprocessor 116 of the initiator assembly 12 measures the resistance of the initiating circuit 112. The microprocessor 116 may, for example, provide the measured resistance of the initiating circuit 112 to the electrical control system 120. The microprocessor 116 may also provide a signal indicating whether the measured resistance of the initiating circuit 112 is within or outside of an acceptable range to the electrical control system 120. The processor of the electrical control system 120 generates a fault signal in response to the measured resistance being outside of the expected resistance range. Alternatively, the processor of the electrical control system 120 may receive the measured resistance of the initiating circuit 112 from the microprocessor 116, compare the measured resistance to the acceptable range, and generate the fault signal in response to the measured resistance being outside of the acceptable range. In addition, according to some implementations, having the initiation switches 113a, 113b in the electrical control system 120 allows for a smaller footprint for the hardware within the initiator assembly 12.

Figure 5:
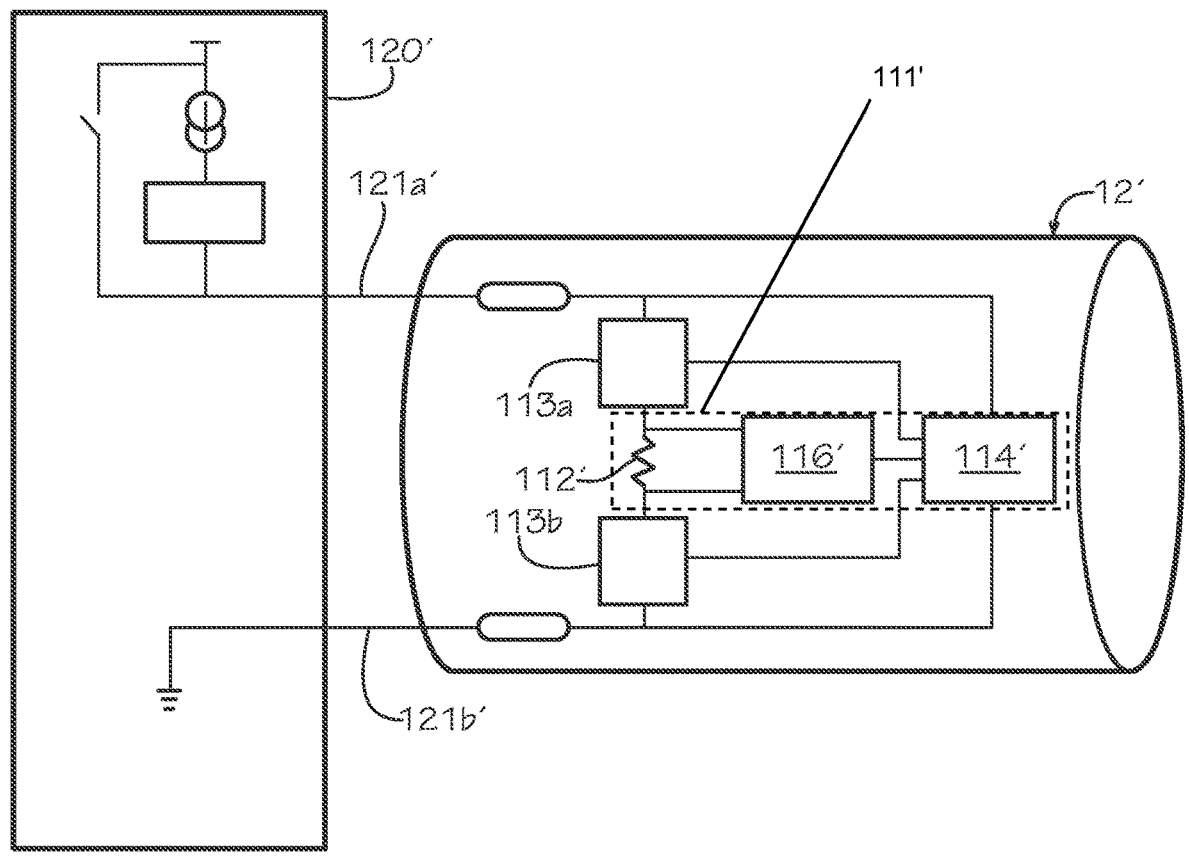
FIG. 5 illustrates a circuit diagram for the initiator assembly having two wires according to another implementation.

FIG. 5 shows another implementation of an exemplary circuit diagram for the initiator assembly 12' and vehicle electrical control system 120', according to certain implementations. In this implementation, the vehicle electrical control system 120' is coupled to the initiator assembly 12' with two wires, 121a' and 121b'. The initiation switches 113a', 113b' are in the initiator assembly 12'. According to some implementations, having the initiation switches 113a', 113b' in the initiator assembly 12' allows for diagnostics of the initiating circuit 112' and initiation switches 113a', 113b' to be coordinated within the initiator assembly 12'. The initiator assembly 12' also includes a validation device 111' that includes a memory 114' for communicating and storing the validation information, an initiating circuit 112', and a microprocessor 116' for measuring a resistance of the initiating circuit 112'.

Figure 6:
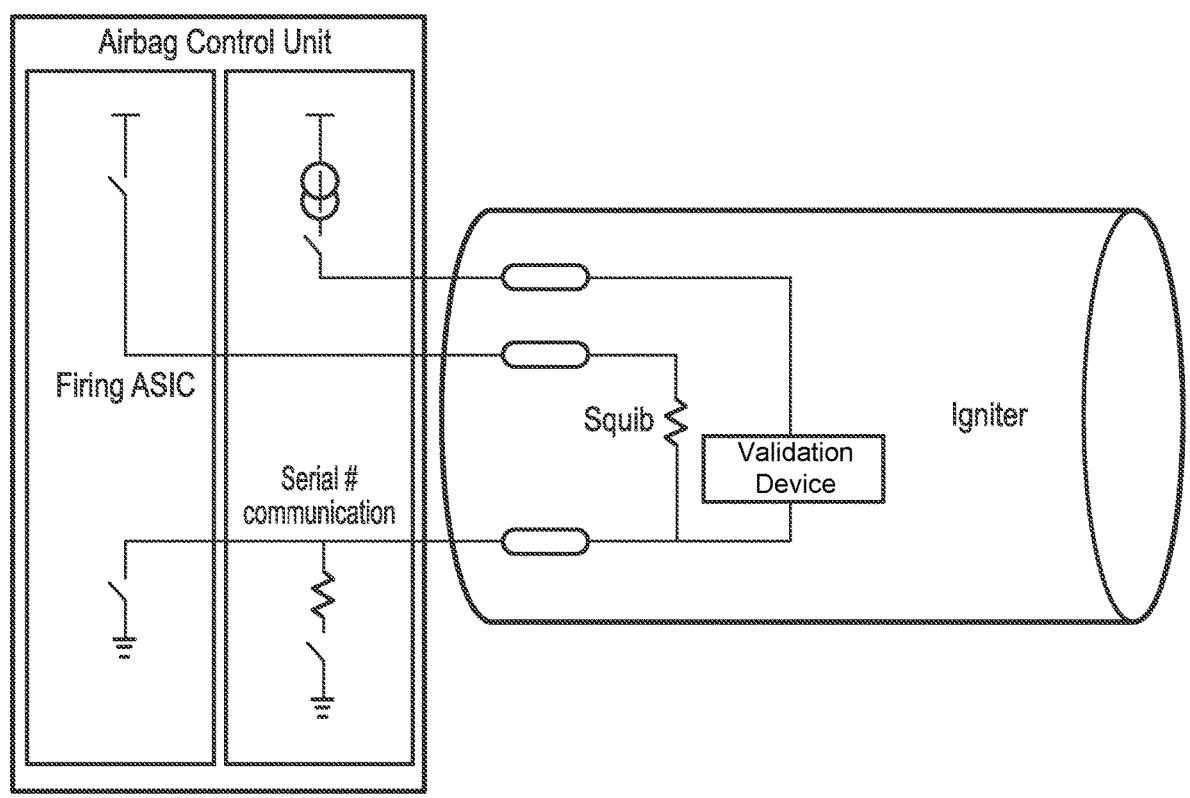
FIG. 6 illustrates a circuit diagram for the initiator assembly having three wires according to another implementation.
Figure 7:
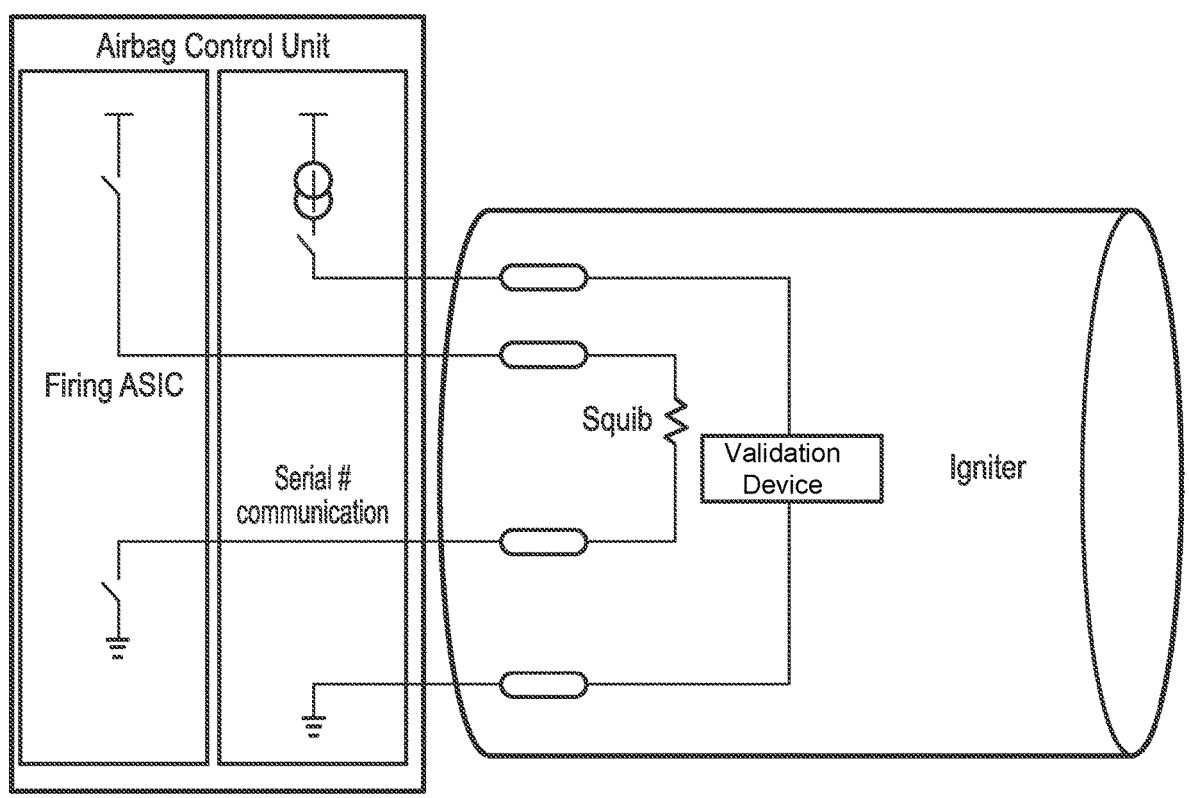
FIG. 7 illustrates a circuit diagram for the initiator assembly having four wires according to another implementation.

The diagrams shown in FIGS. 4 and 5 have two wires 121a, 121b and 121a', 121b' in communication between the initiator assembly 12, 12' and the electrical control system 120, 120'. However, in other implementations, more than two wires may be used to electrically couple the initiator assembly and the electrical control system. For example, FIG. 6 illustrates an implementation using three wires, and FIG. 7 illustrates an implementation using four wires.

Figure 8:
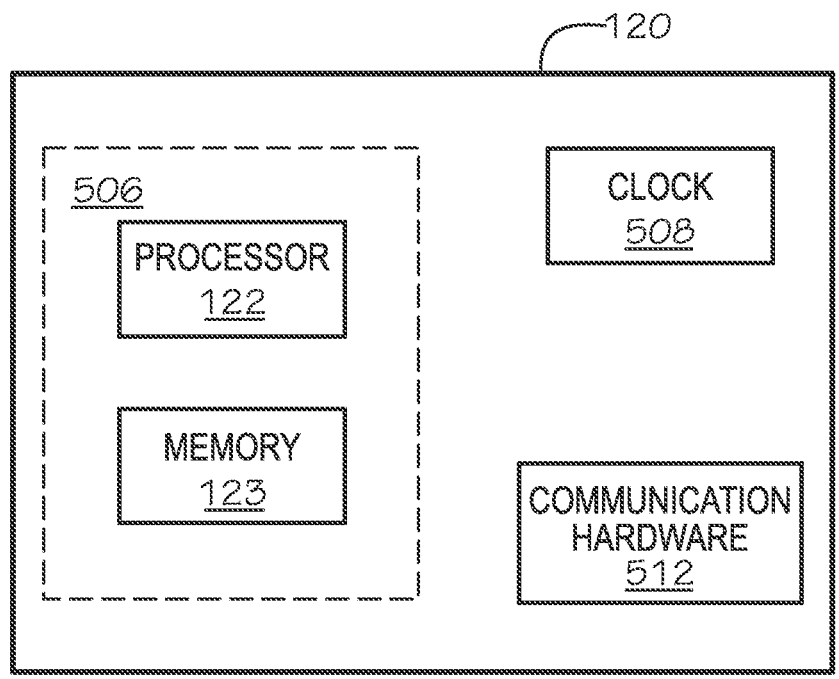
FIG. 8 illustrates a block diagram of an electrical control system according to one implementation.

FIG. 8 illustrates a block diagram of the electrical control system 120, according to one implementation. The electrical control system 120 may include a computing unit 506, a system clock 508, and communication hardware 512. In its most basic form, the computing unit 506 may include a processor (e.g., the processor described above for the electrical control system 120) and a system memory 123 (e.g., the second memory described above for the electrical control system 120). The processor 122 may be a standard programmable processor that performs arithmetic and logic operations necessary for operation of the electrical control system 120. The processor 122 may be configured to execute program code encoded in tangible, computer-readable media. For example, the processor 122 may execute program code stored in the system memory 123, which may be volatile or non-volatile memory. The system memory 123 is only one example of tangible, computer-readable media. In one aspect, the computing unit 506 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 122, the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 9:
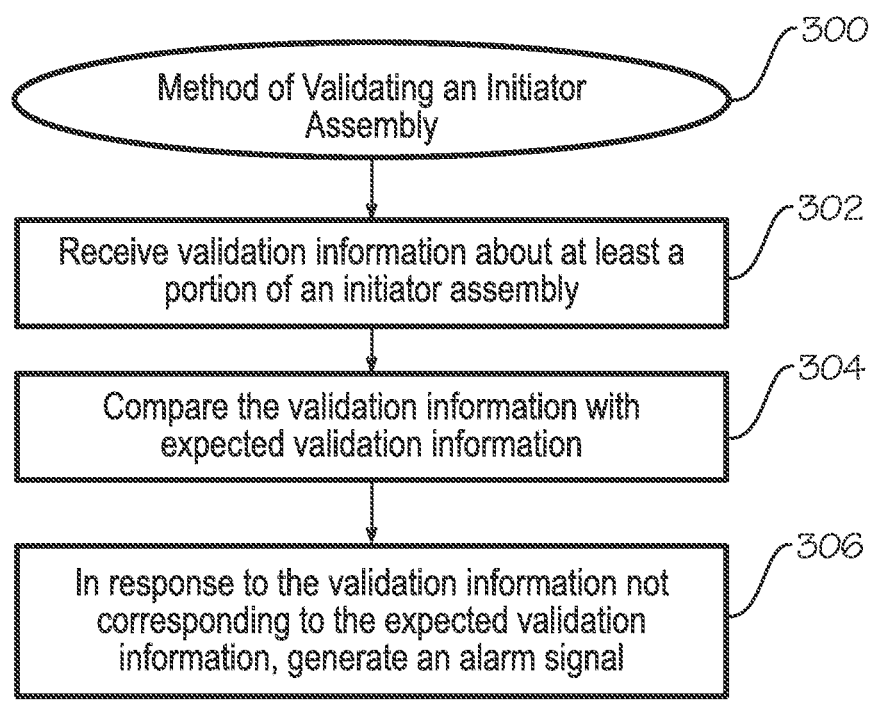
FIG. 9 illustrates a method of validating a vehicle pyrotechnic initiator assembly according to one implementation.

FIG. 9 illustrates a method of validating a vehicle pyrotechnic initiator assembly according to one implementation. The method 300 begins with receiving validation information about at least a portion of a vehicle pyrotechnic initiator assembly at step 302. Then, at step 304, the validation information is compared to the validation information with expected validation information. In response to the validation information not corresponding to the expected validation information, an alarm signal is generated in step 306.

Aspects of the present invention are described above with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A vehicle pyrotechnic initiator assembly comprising:
an initiator comprising at least one electrode pin; and
a validation device in electrical communication with the at least one electrode pin, wherein the validation device provides validation information about at least a portion of the initiator assembly,
wherein the initiator comprises at least two electrode pins and an initiating circuit electrically coupled to the at least two electrode pins, the at least two electrode pins being physically coupled to a first housing, the first housing further comprising the initiating circuit, and the validation device is disposed within a second housing, the second housing defining at least two openings, each opening sized to receive one of the electrode pins therethrough, the second housing being separate from the first housing and a safety device in which the initiator is configured for being disposed, and the electrode pins being electrically coupled to the validation device in the second housing via at least an annular portion of a surface of the openings.

2. The vehicle pyrotechnic initiator assembly of claim 1, wherein the validation device comprises an electrical circuit that provides the validation information.

3. The vehicle pyrotechnic initiator assembly of claim 1, wherein the validation device comprises a memory, the memory stores the validation information.

4. The vehicle pyrotechnic initiator assembly of claim 1, wherein the validation information comprises a date associated with an expiration of the initiator assembly.

5. The vehicle pyrotechnic initiator assembly of claim 1, wherein the validation device is in electrical communication with an electrical control system disposed within the vehicle, the electrical control system comprising a second memory and a processor in communication with the second memory, wherein the processor executes computer-readable instructions stored on the second memory, said instructions cause the processor to: receive the validation information from the validation device, and generate an alarm signal if the validation information indicates the vehicle pyrotechnic initiator assembly is expired.

6. The vehicle pyrotechnic initiator assembly of claim 5, wherein the validation information comprises a date of manufacture of the vehicle pyrotechnic initiator assembly, and the instructions further cause the electrical control system processor to generate the alarm signal in response to a current date being later than the date of manufacture plus an expiration period following the date of manufacture.

7. The vehicle pyrotechnic initiator assembly of claim 6, wherein the alarm signal is an expiration alarm signal, and the validation information further comprising a manufacturer identity associated with a manufacturer of the vehicle pyrotechnic initiator assembly, and the instructions further cause the electrical control system processor to: compare the manufacturer identity with an expected manufacturer identity, and generate a counterfeit alarm signal if the manufacturer identity and the expected manufacturer identity do not correspond.

8. The vehicle pyrotechnic initiator assembly of claim 5, wherein the validation information comprises an expiration date of the vehicle pyrotechnic initiator assembly, and the instructions further cause the electrical control system processor to generate the alarm signal in response to a current date being later than the expiration date.

9. The vehicle pyrotechnic initiator assembly of claim 8, wherein the alarm signal is an expiration alarm signal, and the validation information further comprising a manufacturer identity associated with a manufacturer of the vehicle pyrotechnic initiator assembly, and the instructions further cause the electrical control system processor to: compare the manufacturer identity with an expected manufacturer identity, and generate a counterfeit alarm signal if the manufacturer identity and the expected manufacturer identity do not correspond.

10. The vehicle pyrotechnic initiator assembly of claim 1, wherein the validation information comprises a manufacturer identity associated with a manufacturer of the initiator assembly, and the validation device is in communication with an electrical control system disposed within the vehicle, the electrical control system comprising a processor in communication with a second memory within the electrical control system, wherein the processor executes computer-readable instructions stored on the second memory, said instructions cause the processor to: compare the manufacturer identity with an expected manufacturer identity, and generate a counterfeit alarm signal if the manufacturer identity and the expected manufacturer identity do not correspond.

11. The vehicle pyrotechnic initiator assembly of claim 1, wherein the validation device is in electrical communication with an electrical control system disposed within the vehicle, the electrical control system comprising a processor in communication with a second memory within the electrical control system, wherein the processor executes computer-readable instructions stored on the second memory, said instructions cause the processor to allow an initiating current to be conducted to a initiating circuit of the initiator.

12. A method of validating a vehicle pyrotechnic initiator assembly comprising:
  receiving validation information from a controller about at least a portion of a vehicle pyrotechnic initiator assembly, wherein the controller is connected to a first power circuit, wherein the validation information comprises a date associated with an expiration of the initiator assembly;
  comparing the validation information with expected validation information; and
  in response to the validation information not corresponding to the expected validation information:
    generating an alarm signal; and
    maintaining at least one initiation switch in a position that disconnects a second power circuit from an ignition circuit in the vehicle pyrotechnic initiator assembly.

13. The method of claim 12, wherein the date is an expiration date of the initiator assembly.

14. The method of claim 12, wherein the date is a date of manufacture of the initiator assembly.

15. The method of claim 12, wherein the validation information further comprises a manufacturing identity associated with a manufacturer of the initiator assembly.

16. The method of claim 12, wherein the validation information comprises a manufacturing identity associated with a manufacturer of the initiator assembly.

17. A vehicle safety device comprising a vehicle pyrotechnic initiator assembly in electrical communication with a vehicle electronic control unit (ECU), the vehicle pyrotechnic initiator assembly comprising:
  an initiator comprising an ignition circuit connected to at least one electrode pin that is in electrical communication with a first power circuit and a second power circuit, said first and second power circuits connected in parallel, within the ECU, to the at least one electrode pin;
  at least one initiation switch, controlled by the ECU, in a position that selectively connects and disconnects the first and/or second power circuits from an ignition circuit in the vehicle pyrotechnic initiator assembly to prevent pyrotechnic ignition;
  a validation device in electrical communication with the at least one electrode pin and one of the power circuits that is configured to power the validation device without causing pyrotechnic ignition, wherein the validation device provides validation information about at least a portion of the vehicle safety device.

18. The vehicle safety device of claim 17, wherein the validation device provides validation information about at least a portion of the initiator assembly.

19. A vehicle pyrotechnic initiator assembly comprising:
  an initiator comprising at least one electrode pin providing power to the initiator assembly;
  a validation device in electrical communication with the at least one electrode pin, wherein the validation device provides validation information about at least a portion of the initiator assembly,
  wherein the initiator comprises an initiating circuit in electrical communication with the at one least electrode pin, and the initiating circuit and the validation device are disposed within a housing of the initiator assembly,
  a first power circuit external to the initiator assembly and configured to initiate pyrotechnic ignition of the initiating circuit;
  a second power circuit external to the initiator assembly and configured to provide power to a microcontroller and an electrical circuit that stores validation information in the validation device,
  at least one initiation switch in a position that selectively connects and disconnects the first power circuit from an ignition circuit in the vehicle pyrotechnic initiator assembly to prevent pyrotechnic ignition,
  wherein the first and second power circuits are parallel circuits connected to the at least one electrode pin.

* * * * *